July 9, 1929.   I. F. KINNARD ET AL   1,719,890

ELECTRIC METER

Filed July 12, 1926

Inventors:
Isaac F. Kinnard,
William H. Pratt,
by
Their Attorney.

Patented July 9, 1929.

1,719,890

UNITED STATES PATENT OFFICE.

ISAAC F. KINNARD, OF LYNNFIELD, AND WILLIAM H. PRATT, OF LYNN, MASSACHUSETTS, ASSIGNORS TO GENERAL ELECTRIC COMPANY, A CORPORATION OF NEW YORK.

ELECTRIC METER.

Application filed July 12, 1926. Serial No. 121,890.

Our invention relates to electric meter motors and in particular to an improved damping arrangement for certain meter motors of the induction type.

In integrating type electric meters it is necessary to provide means for damping the rotative element in order that the speed will be a function of the electrical quantity being measured. It has been the practice in building induction type integrating meters to provide in addition to the necessary driving magnetic system some kind of damping means which usually comprises a damping disc and drag magnets. In the usual induction disc watthour-meter element for example, there is a rotary disc of conducting material acted upon by a driving magnetic system and also by a damping magnet system. While it has long been known that the torque fluxes of the driving magnetic system of such a meter also produce a certain amount of retarding or damping force upon the disc, this particular retarding force has never been utilized heretofore and in fact has always been considered a detriment since it causes errors in the operation of the ordinary meter under certain conditions unless compensated for.

In accordance with the broad aspect of our invention we greatly increase the damping effect of the ordinary driving magnet system in meters of this type and utilize the same to produce the necessary meter damping whereby a separate drag magnet system for this purpose may be eliminated. More specifically our invention relates to a utilization of the potential flux of this type of meter for damping purposes and the particular application hereinafter described applies to an electric flow meter.

The novel features of our invention will be pointed out in the claim appended hereto. For a better understanding of the invention reference is made in the following description to the accompanying drawing in which Fig. 1 represents the essential parts of and the type of meter to which our invention has been applied for the purpose of illustration; and Fig. 2 shows the electrical connections of a meter of our invention when used as a flow meter.

Figure 1:
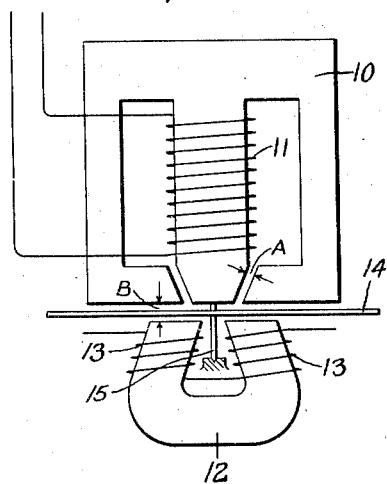
Figure 2:
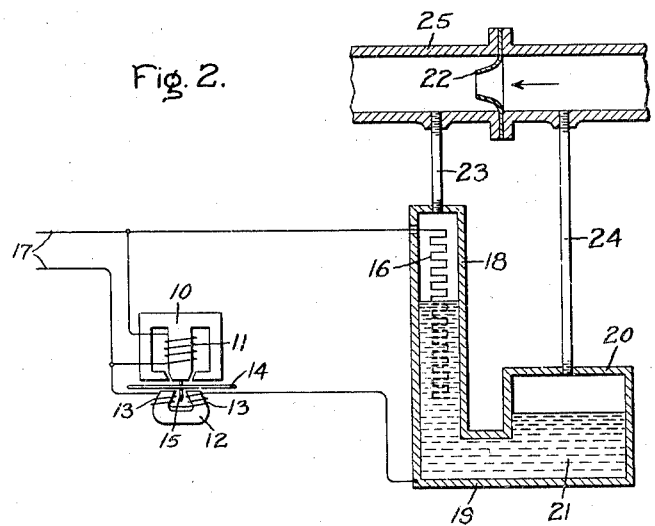

Referring to Fig. 1, we have represented here the essential parts of a meter built in accordance with our invention. It will be noted that the parts appear to be substantially similar to the driving element of an ordinary induction watthour meter and in fact the meter of our invention may differ in structure from the driving element of the ordinary watthour meter in dimensional relations only. The parts comprise the potential core 10 with its winding 11, the core 12 on which is wound the current coils 13, and the intermediate armature, preferably a disc 14, of conducting material rotatably mounted with the shaft 15. The manner in which the current and potential fluxes of such a meter cooperate to produce rotation of the disc is well known and in this respect the meter of our invention is similar in principle to previous meters of this type.

In order clearly to bring out the dimensional differences above mentioned, certain comparative values will now be given for the purpose of illustration, but not for the purpose of limiting the invention in this respect. A typical induction wattmeter driving element of the prior art of the general structure represented in Fig. 1 has air gap openings of .046 inch between the inwardly projecting legs of the potential core and the central leg as at A, and a main air gap B of .218 inch between the potential and current magnets wherein the disc 14 is located. As thus dimensioned the greater part of the potential and current fluxes reaching the disc are effective in producing a torque proportional to the product of said fluxes or proportional to the voltage E times the current I, a constant power factor, or $EI \cos \phi$, with varying power factor. However, upon overvoltage conditions, or overload current conditions, either, or both, of the corresponding fluxes may increase and cross the main air gap B to such an extent as to produce appreciable damping of the disc which is reflected in the characteristic droop in the load curve of induction watthour meters upon overload. The damping thus produced is proportional to the square of the damping flux cutting the disc. Various expedients have been used with varying degrees of success to compensate the meter for this source of error. In general, the driving torque of the meter and the constant damping ordinarily produced by separate damping magnets in this type of meter have been made as high as practicable in relation to the variable damping forces produced by the driving magnet system in order to reduce this type of error.

We have discovered that by increasing the air gap A from .046 inch to about .125 inch and reducing the main air gap B from .218 inch to about .170 inch, the amount of potential flux which crosses the main air gap B and produces damping of the disc is increased to such an extent that the usual separate drag magnet system may be dispensed with entirely or, in other words, the potential flux damping which is always present is thus increased to a value which will govern the speed of the disc. The potential flux of the meter through the main air gap is preferably increased several times above that of the usual meter of this general construction; for example, it may be increased to four or five times as much as in the usual meter. If the potential flux through the air gap is increased to five times its usual value, the potential flux damping which increases as the square of the flux would be increased twenty-five times its usual value. This very considerable increase in the potential flux damping of the meter takes the place of and makes separate damping means unnecessary. If the potential flux through the main air gap is increased 500%, the meter torque would ordinarily be increased in the same ratio. Such increase in driving torque is not only unnecessary but it would immediately destroy the proper relation of driving torque to damping. To maintain the meter driving torque within reasonable limits the ampere turns of the current magnet are reduced very considerably from that usually employed; for example, the ampere turns of the current magnet for the new meter may be reduced to as low as 15% of normal. Then, with a potential driving flux of 500% normal and a current flux of 15% normal, we would obtain a driving torque of about 65% normal. This driving torque may be increased somewhat by using a disc armature having a resistance somewhat lower than usual which serves an additional purpose, as explained below. The three factors, increase in potential flux through the main air gap, decrease in current flux, and increase in the conductivity of the armature, may vary somewhat so long as the desired final result is obtained, namely, the proper relation of driving torque to damping necessary to make the speed proportional to the driving torque. The very material increase in potential flux through the disc is brought about for the most part by the redesign of the magnetic structure rather than by increasing the ampere turns of the potential coil, although the latter may be desirable to a limited extent. Due to the very material decrease in the ampere turns of the current coil, the energy consumed by this meter is less than in the normal meter. It is no longer necessary to keep the driving and damping torques high in order to eliminate the damping effect of the driving fluxes. This is because the potential flux is utilized for damping purposes and because the current flux is reduced to a value where its damping effect is negligible at ordinary meter loads. We have found that such increase in potential flux cutting through the disc has a tendency to cause the disc to vibrate. To avoid injurious vibration we prefer to use a disc somewhat heavier than usual; for example, where an aluminum disc having a thickness of .022 inch was previously used we find that a copper disc having a thickness of .035 inch is preferable and that such a disc is heavy enough to offset the increased vibration tendencies which might otherwise be injurious to the meter bearings. The conductivity of the disc is increased above normal and this factor should be considered, as explained above, in proportioning the torque of the meter. In such a meter the usual damping magnets and the supports therefor are omitted. The driving torque is proportional to EI assuming constant power factor, or proportional to EI cos φ assuming variable power factor. The potential flux damping is proportional to E². Therefore the speed S of such a meter is proportional to $\frac{EI}{E^2} = \frac{I}{E}$.

It is seen that such a meter may be used as an integrating conductance meter without any modification whatever when connected as illustrated in Fig. 2 to measure the conductance of an impedance element 16 when the latter is supplied from the same alternating current source 17 as the potential coil 11 of the meter. The current I through the device 16 and the current coils 13 of the meter are proportional to the conductance of device 16. This current will also vary with any change in the voltage E of source 17. It is therefore seen that the conductance of device 16 is proportional to $\frac{I}{E}$ which, as was shown above, is proportional to the speed of the meter where E and I are respectively the voltage and current applied to its corresponding coils 11 and 13.

In the present illustration Fig. 2 16 represents a resistance element of a flow meter for measuring the flow of a fluid in the conduit 25. The element 16 is contained in the vertical leg 18 of a U-shaped chamber 19. The other leg 20 of the chamber is somewhat larger, and the two legs are connected together by a well containing a conducting liquid 21 such as mercury. In conduit 25 is a pressure difference creating device or flow nozzle 22 which creates a pressure difference which bears a definite relation to the rate of flow through the conduit 25. The opposite sides of this flow nozzle communicate with the two legs of the U tube above the mercury by pipes 23 and 24 so that the pressure difference is communicated to the surface of the mercury in the two legs of the U tube. When no flow exists in conduit 25 the pressure difference will be zero and the mercury in the two legs will stand at the same level, which level will be just below the lower end of the resistance element 16. When flow exists in conduit 25, as indicated by the arrow therein, a pressure difference will exist between the leading and trailing sides of the nozzle forcing a portion of the mercury from leg 20 to leg 16. The mercury will therefore rise in leg 18 and flow up and around the resistance 16 as indicated in Fig. 2 thereby varying its conductance. The upper end of resistance 16 is connected to one side of the source 17 and the metallic chamber 19 is connected to the other side of the source through the current coils 13 of the meter. As a result the flow of current through the meter will be proportional to the flow in conduit 25. It will be evident that with a given level of the mercury in tube 18 corresponding to a certain flow in the conduit 25, the meter will have a certain corresponding speed and that changes in voltage of the source 17 will not change this speed because current changes through 16 produced by voltage variations are offset by a corresponding change in the potential damping flux of the meter. As a result the meter correctly integrates the flow of fluid in conduit 25 and voltage regulating devices are unnecessary. Various other arrangements may be employed for varying the current in the current coils of the meter in accordance with the rate of flow in conduit 25; for example, the mercury transformer arrangement described in United States Patent No. 1,560,951 may be employed in place of the resistance element 16.

While we have particularly described our invention as applied to a flow meter, we do not wish to limit it to this particular application, since it will be evident that if the potential E of the source to which the potential coil of the meter is connected is maintained constant, as is usually the case, the meter may be used without modification as a watthour meter for such a circuit. Likewise if the potential and power factor of the circuit are constant, the meter may be used without modification as an ampere hour meter for such a circuit. We may even arrange matters so that that portion of the potential flux which produces damping may be maintained constant with ordinary variations in the voltage E, as by passing this portion of the flux through a saturated magnetic circuit.

In accordance with the provisions of the patent statutes, we have described the principle of operation of our invention, together with the apparatus which we now consider to represent the best embodiment thereof; but we desire to have it understood that the apparatus shown and described is only illustrative and that the invention may be carried out by other means.

What we claim as new and desire to secure by Letters Patent of the United States, is:

An electric integrating meter comprising a rotatably mounted disc of conducting material, an E-shaped potential electromagnet on one side of said disc and a U-shaped current electromagnet on the opposite side of said disc, said electromagnets having their open portions opposite each other whereby the joint action of the fluxes thereof produce the rotation of said disc, the air gaps between the open end portions of the E-shaped potential magnet and the air gap between the two electromagnets being proportioned in relation to the relative strength of the two magnets so that the potential electromagnet produces a damping flux through said disc sufficient in magnitude to control the speed of the meter.

In witness whereof, we have hereunto set our hands this 8th day of July, 1926.

ISAAC F. KINNARD.
WILLIAM H. PRATT.